US 6,736,183 B2

(12) United States Patent
Magnani

(10) Patent No.: US 6,736,183 B2
(45) Date of Patent: May 18, 2004

(54) TOOL FOR FACILITATING THE REMOVAL AND FITTING OF TIRES ON WHEELS

(75) Inventor: Franco Magnani, Correggio (IT)

(73) Assignee: Sicam S.r.l., Correggio (IT)

( * ) Notice: Subject to any disclaimer, the term of this patent is extended or adjusted under 35 U.S.C. 154(b) by 0 days.

(21) Appl. No.: 10/167,426

(22) Filed: Jun. 13, 2002

(65) Prior Publication Data
US 2002/0195207 A1 Dec. 26, 2002

(30) Foreign Application Priority Data
Jun. 26, 2001 (IT) .................................. MO20010024 U

(51) Int. Cl.7 ............................................... B60C 25/04

(52) U.S. Cl. .......................................... 157/1.3; 81/3.55

(58) Field of Search ..................... 81/3.5, 3.55, 3.57; 157/1.17, 1.3

(56) References Cited

U.S. PATENT DOCUMENTS

| 1,676,648 A | * | 7/1928 | Hardiman | 81/3.57 |
| 2,018,083 A | * | 10/1935 | Murdock | 81/3.57 |
| 2,565,216 A | * | 8/1951 | Fox | 157/1.17 |
| 5,771,759 A | * | 6/1998 | Warren | 81/3.09 |
| 6,378,398 B2 | * | 4/2002 | Brix-Hansen | 81/3.57 |

FOREIGN PATENT DOCUMENTS

| AT | 46142 68 | 5/1971 |
| GB | 225 515 | 2/1925 |

* cited by examiner

Primary Examiner—Lee D. Wilson
(74) Attorney, Agent, or Firm—Guido Modiano; Albert Josif; Daniel O'Byrne

(57) ABSTRACT

A tool for facilitating operations for removing and fitting tires on wheels consists of a lever element provided, at one end, with a grip and maneuvering region and, at the opposite end, with an element for resting on the wheels and for acting as a fulcrum and with an element for mutually spacing the wheel rims and the tire beads that can be wedged between them.

4 Claims, 2 Drawing Sheets

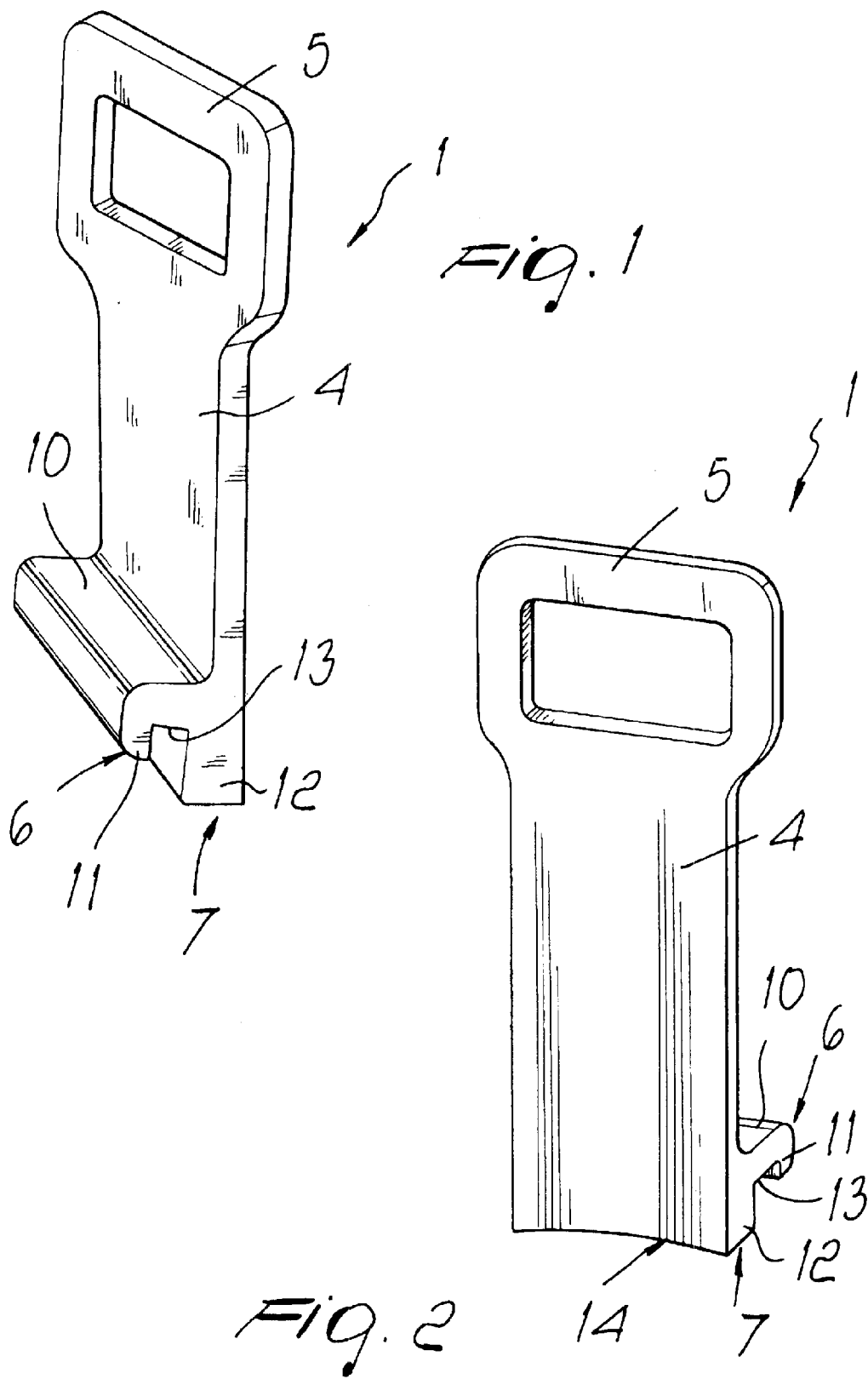

TOOL FOR FACILITATING THE REMOVAL AND FITTING OF TIRES ON WHEELS

BACKGROUND OF THE INVENTION

The present invention relates to a tool for facilitating the removal and fitting of tires on wheels.

In tire removal operations, specialized operators, after deflating the tires and placing them on the platform of a tire changing machine, use a contoured lever which is inserted between the tire beads and the wheel rims to lift said beads in at least one point of their circumference until they move past the peripheral rims of the wheels. This allows insertion of an appropriate tool supported by the operating arm of the tire changing machine, the extraction of the bead from the wheel being completed by turning the platform on which they are placed.

Once this operation has been completed, the specialized operator repeats the same operation for the opposite second bead, extracting it permanently from the wheel.

The above described removal operation is rather tiring for specialized operators, also because during a working day it is repeated several times and for small- and large-diameter wheels, which are increasingly often provided with tires that have rigid and shallow walls.

In order to be able to remove a tire easily, the tire must be first pressed on its walls so that the beads break away from the rim and are displaced centripetally on the wheel, toward its internal channel, which by having a smaller diameter than the lateral rims provides the clearance that allows to manipulate the tire until, as mentioned, it can move past the wheel rim that contains it laterally.

This pressure is applied by specialized operators in different manners, for example by using the bead lifting lever with which the machines are normally provided, in order to unseat the tires; said lever is used improperly as a presser, with the risk of damaging both the wheel, especially if it is coated with paints, and the intimate structure of the shoe of the tire, with consequent severe danger for the user of the vehicle.

Another method of applying said pressure is entirely manual and relies on mere physical strength: in this case, the operation, when possible, is in any case very demanding for operators, especially due to the unquestionable repetitiveness with which it must occur.

Likewise, during fitting, the tire, after being placed manually on the wheel, must be fitted completely thereon by reinserting the lower bead first and then the upper one.

In this reinsertion operation, operators again use said lever to insert a first initial portion of the bead of the tire beyond the rim of the wheel until it reaches the groove of said wheel and then, by using the turret of the machine combined with the rotation of the platform on which the wheel is clamped, complete the circumferential reinsertion of the bead.

In this operation, however, under the action of a gradually increasing traction of the inner edge of the tire while it is being fitted on the wheel, if no proper pression is exerted at the initial point of insertion of the bead, the latter spontaneously escapes from the rim, thwarting the entire operation, which must therefore be repeated from scratch.

SUMMARY OF THE INVENTION

The aim of the present invention is to eliminate the above noted drawbacks of the prior art by providing a tool for facilitating operations for removing and fitting tires on wheels that allows to apply the necessary pressure to the walls of the tires both for removing them and for fitting them in a practical manner and with minimal physical commitment, without damaging the wheel and the structure of the tire.

Within this aim, an object of the present invention is to provide a structure that is simple, easy to provide in practice, safe in use, effective in operation, and most of all relatively low in cost.

This aim and this and other objects that will become better apparent hereinafter are achieved by the present tool for facilitating operations for removing and fitting tires on wheels, characterized in that it consists of a lever element provided, at one end, with a grip and maneuvering region and, at the opposite end, with a resting and fulcrum means for resting on the wheels and for acting as a fulcrum and with a spacer means for mutually spacing the wheel rims and the tire beads that can be wedged between them.

BRIEF DESCRIPTION OF THE DRAWINGS

Further characteristics and advantages of the present invention will become better apparent from the detailed description of a preferred but not exclusive embodiment of a tool for facilitating operations for removing and fitting tires on wheels, illustrated only by way of non-limitative example in the accompanying drawings, wherein:

FIG. 1 is a front perspective view of the tool for facilitating tire bead breaking and seating in operations for removing and fitting on wheels, according to the invention;

FIG. 2 is a rear perspective view of the tool of FIG. 1;

DESCRIPTION OF THE PREFERRED EMBODIMENTS

Figure 3:
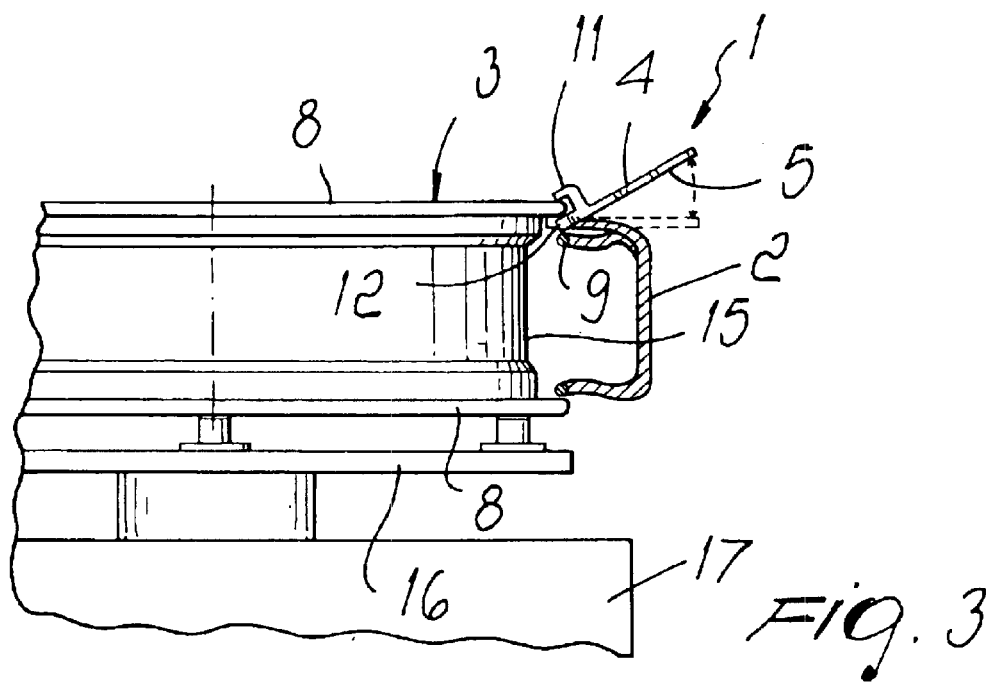
FIG. 3 is a schematic view of the use of the tool, according to the invention.

With reference to the figures, the reference numeral 1 generally designates a tool for removing and fitting tires 2 on wheels 3.

The tool 1 substantially consists of a lever element, the body 4 of which is plate-like; said lever element is provided, at one end, with a grip and maneuvering region, which is provided with a handle-like ergonomic grip 5, and, at the opposite end, with a resting and fulcrum means 6 for resting on the wheels and for acting as a fulcrum and with a spacer means 7 for mutually spacing the rims 8 of the wheels 3 and the beads 9 of the tires 2, which can be wedged between them.

The resting and fulcrum means 6, 7 is constituted by at least one lip 10, which protrudes frontally from one face of the body 4 of the lever element and is folded in a hook-like shape, with a protrusion 11 that is substantially parallel to the end portion of the opposite end of said body 4.

The spacing or spacer means 7 is constituted by a base 12 which has a calibrated thickness; in practice, said base coincides with the end portion of said opposite end of the body 4 and is parallel to the protruding lip 10.

Between said lip and the base 12 a groove 13 is provided, which is adapted to mate with the rims 8 of the wheels 3.

The front or front part along which the base 12 makes contact with the wheels 3, designated by the reference numeral 14, is concave and rounded so as to form a circular arc for better resting.

In the preferred embodiment of the tool 1, such tool is monolithic and is made of rigid plastics; furthermore, the thickness of the base 12 is greater than the thickness of the plate-like body 4 and is calibrated so as to be able to move the beads 9 from the rims 8 of the wheels 3 when the tire specialist wedges it between them.

The operation of the invention is as follows: in order to fit a tire 2 on its wheel 3, the operator clamps the wheel in a known manner on the platform 16 of a tire changing machine 17 and places the tire 2 thereon manually, inserting first the lower bead 9 while the upper one remains outside the upper rim 8.

Figure 4:
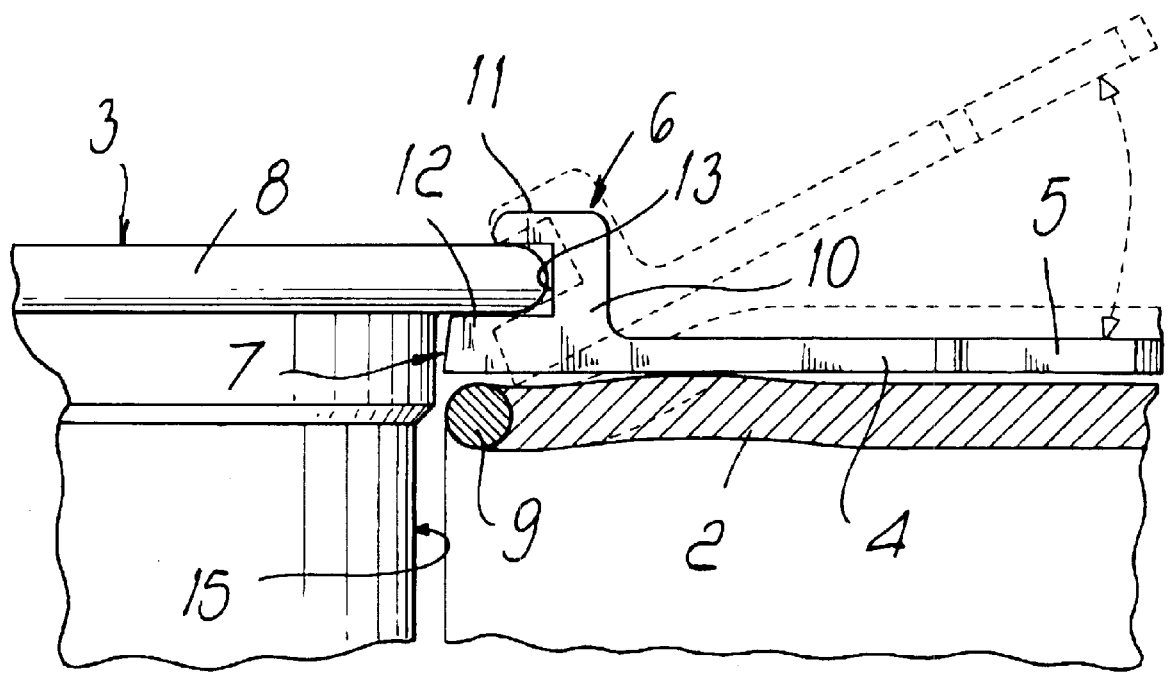
FIG. 4 is a schematic enlarged-scale view of the use of the tool, according to the invention.

In order to insert and complete the fitting of the tire 2, the operator grips the tool 1 by the handle 5 and forces a first portion of bead 9 to move past said rim 8; then he wedges by forcing the base 12 between said first portion of the bead 9 and the rim 8, keeping the tool 1 inclined upward (see FIG. 3 and the position shown in dashed lines on FIG. 4) at approximately 30–45° with respect to the horizontal.

The forced wedging of the base 12 moves the bead 9 away from the rim 8; then the operator turns the tool 1 downward, pressing on the wall of the tire 3 until the bead 9 lies within the groove 15 of the wheel 3, which by having a diameter that is significantly smaller than the nominal diameter of said wheel 3, allows the tire 2 a good possibility of motion with respect to it.

In positioning the tool 1 for this maneuver, the operator rests the lip 10 on the outer face of the rim 8, making sure that said rim 8 enters the groove 13 formed between the protrusion 11 and the base 12.

In this manner, the fulcrum provided by the lip 10 allows to apply, with minimal physical effort, the pressure required to bend the bead 9 centripetally.

The operator can then turn the platform 16 while leaving the tool 1 inserted in the initial point, and by using the same operating "turret" or more specifically the semicircular tool that is mounted thereon and with which the tire changing machine 17 is provided as a presser, completes the circumferential movement of the bead 9 past the rim 8.

Likewise, in the removing step, the operator, after deflating the tire 2 completely, again with the wheel clamped on the platform 16, after gripping the tool 1, wedges the base 12 between the bead 9 and the rim 8 of the wheel 3, and by turning the tool 1 downward, acting in a lever-like fashion on the lip 10, presses on the wall of the tire 2, pushing the bead 9 into the groove 15 so as to loosen it.

Then the operator inserts the usual lever with which tire changing machines are provided between the bead 9 and the wheel 3 and lifts a first bead portion 9, making it move outward past the rim 8.

By then using said usual semicircular tool with which the turret is provided, and by turning the platform 16, the operator can easily complete the operation for removing the upper bead and then proceeds with the extraction of the lower bead.

In practice it has been found that the described invention achieves the intended aim and objects.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the scope of the protection of the appended claims.

The disclosures in Italian Utility Model Application No. MO2001U000024 from which this application claims priority are incorporated herein by reference.

What is claimed is:

1. A tool for facilitating operations for removing and fitting tires on wheels, which consists of a lever element comprising: a first end having a grip and maneuvering region; a second, opposite end; a resting and fulcrum means, provided at said second end, for resting on a wheel rim and for acting as a fulcrum; and a spacer means for wedging between, and spacing from each other the wheel rim and a tire bead, said resting and fulcrum means comprising at least one lip that protrudes frontally from a face of said lever element, said lip being folded in hook shape and lying substantially parallel to an end portion of said second end, for resting on the wheel rim, said spacer means comprising a base that has a calibrated thickness coinciding with the end portion of said second end, said base being parallel to said hook folded portion of the protruding lip, the tool further comprising a groove for coupling to said wheel rim formed between said hook lip and said base, said lever element comprising an elongated plate body having a lower face for contact with a tire wall and an upper face, from which said hook lip protrudes, and the tool having the calibrated thickness of said end base greater than a thickness of said plate-like body.

2. The tool of claim 1, wherein said grip region is formed as an ergonomic handle.

3. The tool of claim 1, comprising a front part along which said base makes contact with said wheel is concave and is rounded so as to trace a circular arc.

4. The tool of claim 1, provided as a monolithic body.

* * * * *